3,033,288
SECONDARY RECOVERY OF OIL FROM
UNDERGROUND RESERVOIRS
LeRoy W. Holm, Crystal Lake, Ill., assignor to The Pure
Oil Company, Chicago, Ill., a corporation of Ohio
No Drawing. Filed Dec. 29, 1958, Ser. No. 783,123
7 Claims. (Cl. 166—9)

This invention relates to the recovery of petroleum from reservoirs beneath the earth's surface, and is more particularly concerned with a flooding method for recovering petroleum in greater amounts than is possible by conventional flooding methods.

It is well known in the secondary recovery art to inject a slug of fluid which is miscible with both the petroleum oil and the water phases in the reservoir, and to drive this slug of fluid through the reservoir by injecting floodwater behind it. Typical of the fluids used in such secondary recovery processes are carbon dioxide and the light alcohols. When the fluid is alcohol, for example, it is attempted to form and maintain zones of oil-alcohol and water-alcohol miscibility, with a buffer zone of alcohol maintained between the aforementioned zones as they move through the reservoir from the injection well to the producing well.

The presence of water of low salinity in the reservoir hinders the removal of petroleum by single-phase flooding processes because a large proportion of the injected alcohol dissolves into the reservoir water. Because of the high solubility of alcohol in reservoir water of low salinity, the buffer zone of alcohol breaks down and the miscibility of the oil-to-alcohol-to-water phase displacement is lost. This causes high water-to-oil production ratios at the producing well, and increases the alcohol requirement for a given petroleum recovery.

Briefly, this invention teaches a process for the recovery of oil from reservoirs containing water of low salinity comprising the steps of injecting a brine solution into the reservoir, then injecting a slug of alcohol or other material which is soluble in both petroleum and fresh water, but is comparatively insoluble in brine, and finally injecting fresh water to drive the brine and alcohol through the formation to a producing well.

It is an object of this invention to provide an improved method for secondary recovery of oil from underground reservoirs.

Another object of this invention is to provide a method for recovering a higher percentage of the petroleum present in reservoirs which contain water of low salinity.

In carrying out the process of this invention, a slug of water having a total salt content of at least about 10% by weight is first injected through an input well into a petroleum reservoir containing water having a salt content of substantially less than 10% by weight. The quantity of brine injected must be sufficient to substantially displace the water in the portion of the reservoir surrounding the injection well. In general, quantities equivalent to about 0.10 of the reservoir pore volume are satisfactory. Then, about the same volume of a fluid, such as tert-butyl alcohol or isopropyl alcohol, which is soluble in, or miscible with, both oil and substantially fresh water, but which is substantially immiscible with relatively saline water, is injected into the reservoir behind the first injected brine. Finally, substantially fresh water is injected in the conventional flooding manner to drive the previously injected brine and alcohol slugs towards the producing well. This final water injection is continued until the water-to-oil ratio at the producing wells has risen to such a level that further oil recovery becomes uneconomical, at which time injection is terminated. This process is applicable to any of the standard flooding patterns, such as the line-drive, 5-spot, or 9-spot systems.

The improvement in oil recovery obtained by the process of this invention is demonstrated by the results of tests conducted on a core initially containing 0.62 pore volume of oil and 0.38 pore volume of fresh water. Following the process of this invention, the core was flooded by injecting a quantity of brine consisting of 10% by weight sodium chloride dissolved in water, in an amount equivalent to 0.25 of the core pore volume. Then 0.20 pore volume of tert-butyl alcohol was injected, and the core was flooded with fresh water. The core containing the same initial oil and fresh water as the above was also treated according to the processes of the prior art by injecting tert-butyl alcohol in amounts equivalent to 0.2 and 0.4 core pore volume, respectively, and then flooding with fresh water. The results of these tests are shown in Table I.

Table I

| Run No. | Brine Injected (percent P.V.) | Alcohol [1] Injected (percent P.V.) | Oil Recovery at water Breakthrough (percent O.I.P.) | Ultimate Oil Recovery (percent O.I.P.) |
|---|---|---|---|---|
| (1) Brine (10%)—Alcohol-Water | 25 | 20 | 67 | 78 |
| (2) Alcohol-Water | 0 | 20 | 48 | 56 |
| (3) Alcohol-Water | 0 | 40 | 68 | 79 |

[1] Tert-butyl alcohol was used.

Comparing the results obtained in Run Nos. 1 and 2, it can be seen that by using the same quantity of the same alcohol with the process of this invention, a very large improvement in the amount of oil recovered, expressed as a percent of the oil originally in place, was obtained. Comparing the results obtained in Run Nos. 1 and 3, it can be seen that with the process of this invention nearly identical oil recoveries can be achieved with only half of the volume of alcohol required by the prior art process.

This process is applicable only in recovering oil from reservoirs containing water having salinities of substantially less than about 10% by weight dissolved salts. Where the salinity of the reservoir water approaches 10% by weight salts, the process of this invention will have substantially no advantage over the processes of the prior art. The solubilities of two alcohols suitable for use with this invention are set out in Table II.

Table II

| tert-Butyl alcohol | | n-Propyl Alcohol | |
|---|---|---|---|
| Wt. percent NaCl in Brine Solution | cc. Alcohol per 100 cc. Brine (25° C.) | Wt. percent NaCl in Brine Solution | g. Alcohol per 100 g. Brine (25° C.) |
| 0 | α | 0 | α |
| 3 | 246 | 1 | α |
| 6 | 55 | 4 | 87 |
| 10 | 12 | 4.7 | 15 |
| 12 | 9 | 8.9 | 9 |
| | | 11.5 | 8 |

It can be seen that an increase in salt concentration beyond about 10% does not greatly reduce the solubility of these alcohols. However, if the concentration of salt becomes less than about 10%, the solubility of alcohol rapidly increases until it reaches infinity.

By way of non-limiting explanation of this invention, it appears that the brine slug injected ahead of the alcohol displaces a low-salinity water from the reservoir and forms a buffer zone between the displaced water and subsequently-injected alcohol. Since the alcohol selected is relatively insoluble in the brine but completely soluble in the petroleum oil, it seeks out the oil and effects a single-phase displacement thereof, but does not displace or dissolve into the reservoir water or the brine to any great extent. Since the fresh water injected after the alcohol is completely miscible with the alcohol, it effects a single-phase displacement of the alcohol and perpetuates a zone of alcohol to continue the single-phase displacement of oil throughout the total distance between the injection well and the producing well.

As a specific example of the process of this invention, an underground reservoir containing 70% by volume petroleum oil and 30% by volume water (containing 2% by weight total dissolved solids) is injected with a quantity of brine equivalent to 10% by volume. The brine solution consists of mixed salts, principally sodium chloride, amounting to 10% by weight, dissolved in water. Then 10% by volume of tert-butyl alcohol is injected behind the brine, and the brine and alcohol are driven through the formation by injection of substantially fresh water. Oil is produced at a producing well, and the injection of fresh water is continued until the ratio of oil-to-water recovered at the producing well becomes equal to about 0.2. In this example all volumes are expressed as a percentage of the pore volume of the reservoir.

As before stated, materials other than alcohol which are capable of solution in, or are miscible with, oil and relatively fresh water having a salinity substantially less than 10% by weight total solids, but which are imiscible with relatively saline water having a total solids content greater than about 10% by weight, are suitable for use in this process. Typical suitable alcohols include t-butanol, sec-butanol, n-butanol, isobutanol, isopropanol, and amyl-alcohols. Other suitable materials include ketones, such as methyl ethyl ketone, diethyl ketone, and di-n-propyl ketone; aldehydes such as acetaldehyde, propinaldehyde, and butyraldehyde; and organic acids such as acetic acid, propionic acid, n-butyric acid, and isobutyric acid. Mixtures of the aforenamed liquids may also be used with the process of this invention.

What is claimed is:

1. A method for recovering petroleum from a natural underground reservoir containing petroleum and water having a total salt content of less than about 6% by weight comprising injecting into said reservoir through an injection well about 0.1 reservoir pore volume of brine having a total salt content of not less than about 10% by weight, injecting behind said brine about 0.1 reservoir pore volume of fluid soluble in both petroleum and fresh water, but substantially insoluble in said brine, injecting water behind said fluid to drive said fluid toward a producing well, and producing petroleum from the producing well.

2. A process according to claim 1 in which the solubility of said fluid in said brine is not greater than about 1 part of fluid in 10 parts of brine, by weight.

3. A method according to claim 1 in which said fluid consists of at least one compound selected from the group consisting of $C_2$—$C_5$ alcohols, ketones, aldehydes, and organic acids.

4. A process according to claim 1 in which the concentration of salts in said brine is about 10% by weight.

5. A process according to claim 1 in which said salt is principally sodium chloride and said fluid comprises tert-butyl alcohol.

6. A process according to claim 1 in which said salt is principally sodium chloride and said fluid comprises n-propyl alcohol.

7. A process according to claim 1 in which said salt is principally sodium chloride and said fluid comprises isopropyl alcohol.

References Cited in the file of this patent

UNITED STATES PATENTS

| | | |
|---|---|---|
| 2,742,089 | Morse et al. | Apr. 17, 1956 |
| 2,771,139 | Johnson et al. | Nov. 20, 1956 |
| 2,885,003 | Lindauer | May 5, 1959 |

OTHER REFERENCES

"Geology of Petroleum," A. I. Levorsen, W. H. Freeman and Company, San Francisco, 1956, page 297.